UNITED STATES PATENT OFFICE.

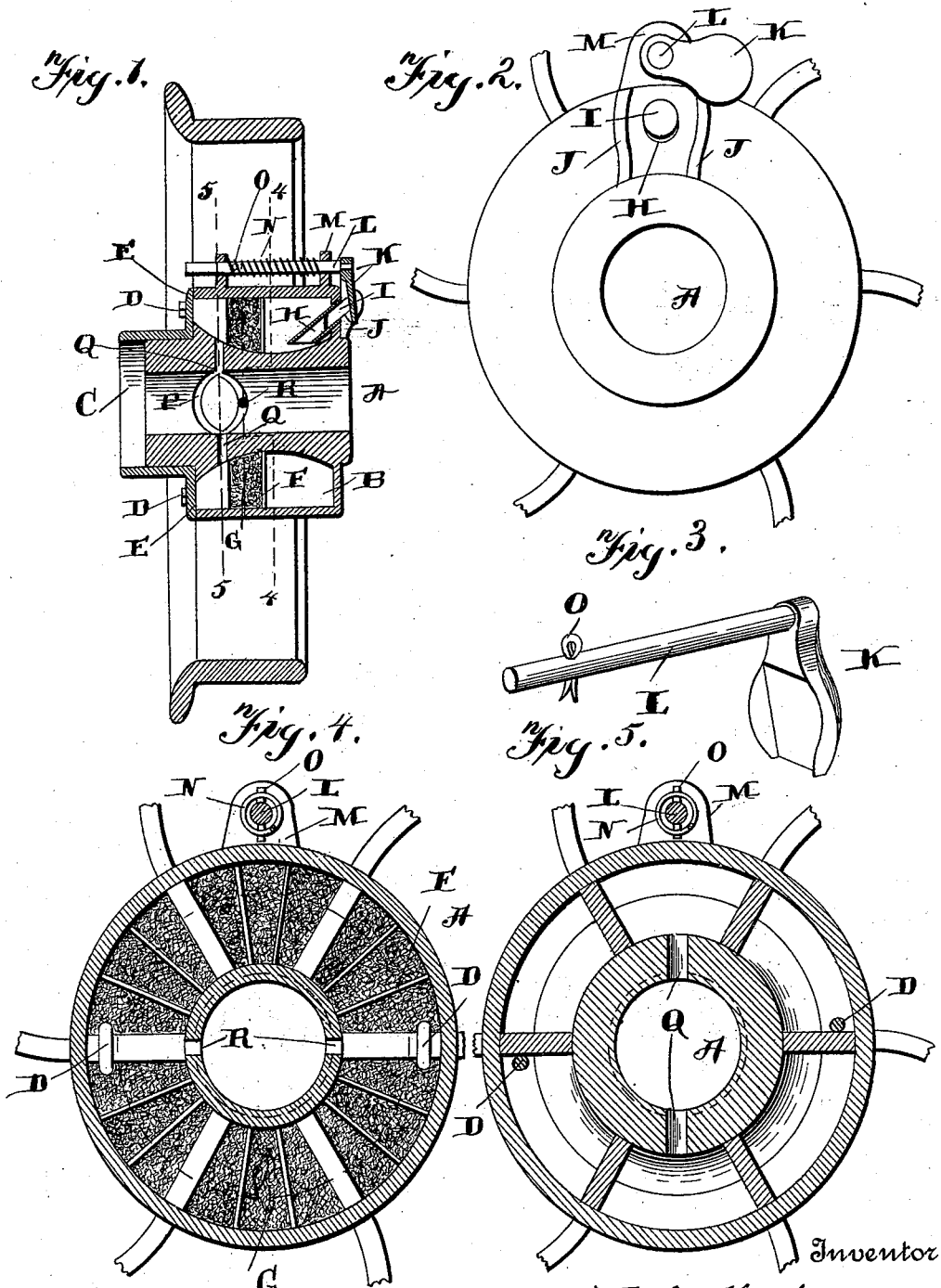

FRANKLIN C. HOCKENSMITH, OF IRWIN, PENNSYLVANIA.

WHEEL.

SPECIFICATION forming part of Letters Patent No. 560,584, dated May 19, 1896.

Application filed November 19, 1895. Serial No. 569,452. (No model.)

*To all whom it may concern:*

Be it known that I, FRANKLIN C. HOCKENSMITH, of Irwin, in the county of Westmoreland and State of Pennsylvania, have invented certain new and useful Improvements in Wheels; and I do hereby declare the following to be a full, clear, and exact description of the invention, such as will enable others skilled in the art to which it pertains to make and use it, reference being had to the accompanying drawings, which form part of this specification.

This invention pertains to wheels, and is designed as an improvement upon the invention patented to me July 4, 1893, No. 500,578.

The object of the invention is to provide the oil-chamber in the hub with an improved stopper mechanism, and, further, to so groove the interior of the hub as to facilitate an even distribution of the lubricant upon the shaft or spindle, as well as to connect the different portions of the oil-chamber, and thus return thereto any excess or overflow of oil, which would otherwise flood upon the shaft and be wasted.

Referring to the accompanying drawings, Figure 1 is a vertical longitudinal sectional view of a wheel provided with my improved hub. Fig. 2 is a front view thereof with the holder turned from engagement with the stopper. Fig. 3 is a detail perspective view of the holder. Fig. 4 is a vertical cross-sectional view on line 4 4 of Fig. 1. Fig. 5 is a similar view on line 5 5 of the same figure.

A designates the hub of the wheel carrying the surrounding oil-chamber or casing B. Upon the rear side of the wheel is the collar C, which is held in place by the inwardly-extending bolts D, engaging the radial rim E of the casing. Arranged centrally in the oil-chamber are the wires or bars F, which hold the waste or packing G to one end of the oil-chamber, so as to leave the other portion of the chamber open and unobstructed for the reception of the lubricating-oil. For filling said chamber the same is provided with the inwardly-inclined passage-way H, provided with stopper I. Upon opposite sides of the said stopper and integral with the casing B are lugs J for the purpose of preventing head K of the spring-held bolt L from turning while holding the stopper in its place. The bolt L is extended through lugs M upon the periphery of casing B, and arranged between said lugs is coiled spring N, which is held on the bolt by pin O, and serves to hold the bolt normally pushed backward with its head bearing against the said stopper and holding it in place. When, therefore, it is desired to remove the stopper for filling the reservoir, the bolt must be pulled outward against the pressure of said spring until the bolt-head K will pass the lugs J, when it may be rotated and the head turned to one side so as to permit removal of the stopper. The inner side of the head is concaved or depressed, as shown in Fig. 3, so as to secure a firm hold upon the stopper when holding it in place.

Only one half of the hub A is shown in the section of Fig. 1, and the same is formed with the oppositely-curved grooves P, which meet at Q, which is formed into an oiling-opening, through which the lubricant passes from the oil-chamber. The outer portions of grooves P are connected by ducts R with the oiling-chamber. As the other section of the hub is the counterpart of the section here shown it will be understood that it will have grooves corresponding with grooves P, also the oil-holes Q and R, and thus the hub will be provided with the diametrically opposite holes Q, as in Fig. 5, as well as the oppositely-arranged holes R, as in Fig. 4, the last-named holes being disposed at right angles to the first-named ones. These curved grooves serve to pass the oil around over the shaft at the points where the most strain occurs, thus keeping the parts well lubricated. By having the oil holes or openings arranged diametrically opposite each other it will be seen that if there is an excess of flow from one of the oil-holes the oil, instead of flooding upon the shaft or spindle, will pass around through the grooves and reënter the oil-chamber through one of the other oil-openings, and thus be saved from waste.

Having thus fully described my invention, what I claim, and desire to secure by Letters Patent, is—

1. The combination of an oil-chamber having a filling-opening, a stopper therefor, a bolt carrying a head adapted to hold the stopper in place, and means for preventing the disengagement of the bolt-head from the stopper until the bolt is moved longitudinally, substantially as shown and described.

2. The combination of an oil-chamber having a filling-opening, a stopper therefor, a longitudinally-movable and revoluble bolt, the head projected laterally from one end of the bolt and adapted to engage the stopper when brought to proper position by turning the bolt, and means for preventing the head from turning out of line with the stopper until the bolt is moved longitudinally, substantially as shown and described.

3. The combination of the hub, the oil-chamber provided with a filling-opening, a stopper for said opening, the longitudinally-movable spring-held bolt provided with a head for engaging the stopper and holding it in place, and the lugs projected from the outer wall of the oil-chamber upon opposite sides of the filling-opening so as to prevent the turning of the said headed bolt without first moving the same longitudinally so as to clear the said lugs, substantially as shown and described.

4. The combination of the hub, the oil-chamber, the stopper for the filling-opening of said chamber, the lugs upon opposite sides of the filling-opening, the longitudinally-movable bolt, the head carried thereby for engaging the stopper, the lugs upon the periphery of the oil-chamber through which the said bolt moves, and the coiled spring secured upon the bolt between the said lugs, substantially as shown and described.

5. The combination of the hub having each longitudinal half of its inner surface traversed by the oppositely-curved intersecting grooves P having outlet-ducts Q at their points of intersection, said ducts being diametrically opposite each other, the outer grooves P having the diametrically opposite outlets or ducts R which are on a line extending at right angles to the line of ducts Q, and an exterior oil-chamber into which all of said ducts lead, substantially as shown and described.

In testimony whereof I affix my signature in presence of two witnesses.

FRANKLIN C. HOCKENSMITH.

Witnesses:
NORTON L. GLEASON,
S. C. REMSBERG.